United States Patent [19]
Swirbel et al.

[11] Patent Number: 6,008,873
[45] Date of Patent: Dec. 28, 1999

[54] ISOTROPIC, NON-BIREFRINGENT POLYNORBORNENE ALIGNMENT LAYER FOR A LIQUID CRYSTAL DISPLAY

[75] Inventors: Thomas J. Swirbel, Davie; Patrick M. Dunn, Coral Springs, both of Fla.

[73] Assignee: Motorola, Inc., Schaumburg, Ill.

[21] Appl. No.: 08/917,978

[22] Filed: Aug. 27, 1997

[51] Int. Cl.[6] .................. G02F 1/1333; G02F 1/1337; C09K 19/00
[52] U.S. Cl. .................. 349/123; 349/162; 349/122; 428/1
[58] Field of Search .................. 349/162, 123, 349/117, 122; 428/1

[56] References Cited

U.S. PATENT DOCUMENTS

| | | | |
|---|---|---|---|
| 4,401,537 | 8/1983 | Chern et al. | 204/159.11 |
| 4,725,517 | 2/1988 | Nakanowatari et al. | 430/20 |
| 4,792,211 | 12/1988 | Harada et al. | 349/162 |
| 4,802,740 | 2/1989 | Hotta et al. | 349/162 |
| 5,396,355 | 3/1995 | Wada et al. | 349/117 |
| 5,543,948 | 8/1996 | Takahashi et al. | 349/117 |
| 5,730,899 | 3/1998 | Ohnishi et al. | 349/132 |

*Primary Examiner*—William L. Sikes
*Assistant Examiner*—Kari M. Horney
*Attorney, Agent, or Firm*—Dale W. Dorinski

[57] ABSTRACT

A liquid crystal display device is made with plastic substrates (#1) and has an isotropic, non-birefringent polynorbornene alignment layer (#4) formed over an electrode pattern (#2). This isotropic, non-birefringent polynorbornene alignment layer also functions as a moisture barrier to prevent degradation of the liquid crystal fluid. No additional moisture barrier layers are needed.

13 Claims, 1 Drawing Sheet

ISOTROPIC, NON-BIREFRINGENT POLYNORBORNENE ALIGNMENT LAYER FOR A LIQUID CRYSTAL DISPLAY

TECHNICAL FIELD

This invention relates in general to liquid crystal display devices, and in particular, to alignment layers and moisture barriers for liquid crystal display devices.

BACKGROUND

A liquid crystal display (LCD) is a passive display device that utilizes the modulation of light within a liquid crystal cell to form a visible image. The LCD generally consists of a layer of liquid crystal fluid (a substance which exists at a state between liquid and crystal) between two systems of electrodes. Typically, one or both of the electrodes are transparent and each of the electrode systems is resident upon a transparent substrate. The two substrates are arranged in parallel fashion so as to form a sandwich. An integrated circuit or driver is used to selectively energize portions of the electrodes while other portions remain neutral. When the driver energizes the electrodes, the liquid crystal fluid between the energized electrodes exhibits hydrodynamic turbulence and disperses light due to a change in optical characteristics such as double refraction, optical rotation, dichroism, or optical scattering. The contrast between the dispersed transmitted and/or reflected light creates the figures or characters in the display.

Liquid crystal fluids are roughly classified into three types; smectic, cholesteric, and nematic. The nematic type of liquid crystal fluid has proven to be the most useful for LCDs, finding many uses in industrial, military and consumer products. The interior surface of each of the substrates in the LCD contains a polyimide alignment layer that has a series of minute grooves that are preferentially oriented in a given direction. The liquid crystal molecules immediately adjacent to each of the plates align themselves with the direction of orientation of the alignment layer, that is, they align themselves with the minute grooves. Those molecules that are between the plates orient themselves into a helix, the ends of which correspond with the alignment direction on each plate. When the alignment directions on each plate are at right angles to each other, the helix makes one quarter of a turn which results in linearly polarized light traversing the cell being rotated through an angle of 90°. The switching in normal twisted nematic (TN) displays usually has a transition time on the order of milliseconds. The liquid crystals used in TN displays are principally cyano-biphenyl, phenyl-cyclohexane and cyclohexylcarboxylic ester nematic liquid crystals.

In the usual construction, the cell is sandwiched between an upper and a lower polarizing plate or polarizing filter. These polarizing plates are placed on the exterior side of each of the two substrates. Assuming the axes of the polarizing plates to be at right angles to each other, incident light will then be transmitted through the cell due to the optical activity of the liquid crystal material between the plates. However, when the electric field is applied to the selected electrodes by the driver, the liquid crystal molecules lose their optical activity because the axis of the liquid crystal molecule aligns parallel to the applied electric field. Because the polarizing filters are placed at right angles to each other, as the optical activity is lost from the selected portions of the fluid, those portions become opaque, while the remainder of the cell remains transparent. Of course, if the polarizing filters are parallel, the converse takes place.

Twisted nematic (TN) type LCD's are quite popular, and they find many uses in industrial, military and consumer products. However, one drawback is that the glass used for the substrates is fragile and susceptible to breakage. Some have sought to circumvent this problem by making the substrates out of plastic. However, since plastics are not hermetic, is necessary to coat the substrate surface on the inside of the display with a barrier layer to prevent moisture intrusion into the display. If moisture intrusion occurs, the liquid crystal fluid within the cell will degrade, resulting in black spots that are visible in the display's viewing area. Typically, this problem is circumvented by employing a barrier layer of material such as silicon oxide deposited on the plastic substrate by low temperature chemical vapor deposition. After the barrier layer is deposited, the indium-tin oxide electrodes and alignment layer are deposited. Thus, an additional step and an additional layer of material are required to use plastic substrates. It would be desirable addition to the art if plastic substrates could be used without having to resort to additional processing or complexity of the display.

DETAILED DESCRIPTION OF THE PREFERRED EMBODIMENT

Briefly, according to the invention, a liquid crystal display device made with plastic substrates has a polynorbornene alignment layer formed over the electrode pattern, and this polynorbornene alignment layer also functions as a moisture barrier to prevent degradation of the liquid crystal fluid. No additional moisture barrier layers are needed.

Figure 1:
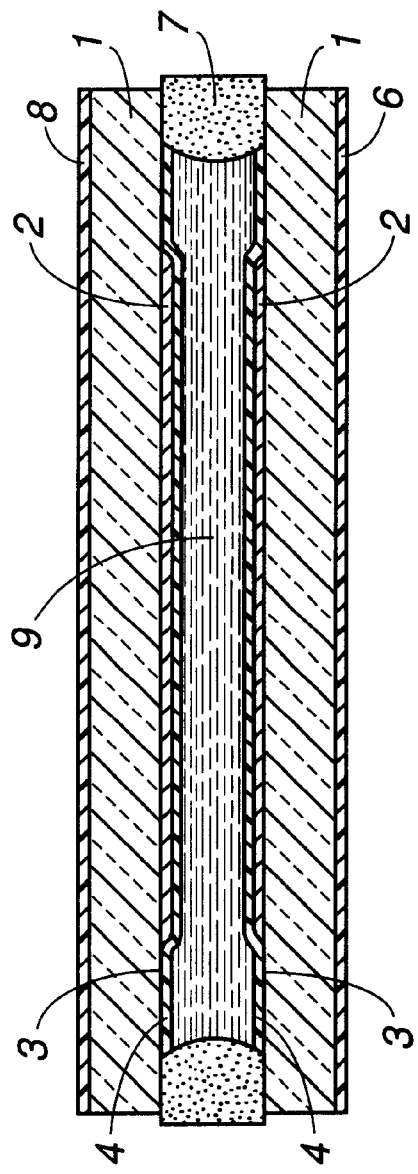
FIG. 1 is a cross sectional view of a liquid crystal display device in accordance with the invention.

Referring now to FIG. 1, a schematic cross-sectional view of an LCD in accordance with our invention is intentionally drawn to an exaggerated scale to better illustrate the features of the invention. The inside surfaces of two substrates 1, made of transparent materials such as plastic or glass, face each other. The faces 3 of each substrate have a patterned electrode film 2 located thereon to form a plurality of display elements in the visual display zone. Overlying the electrode film 2 and the face 3 of at least one of the transparent substrates is a polymeric alignment layer 4. Those skilled in the art will readily appreciate that conventional wisdom dictates that polyimide is used as an alignment layer for LCDs. The phenomena of rubbing a polyimide film to induce it to act as an alignment layer is not completely understood, nor is the specific mechanism of how alignment occurs. Some have postulated that rubbing the polyimide alignment layer creates a series of minute grooves that are preferentially oriented in a given direction. The liquid crystal molecules immediately adjacent to the polyimide align themselves with the direction of orientation of the alignment layer, that is, they align themselves with the minute grooves. Notwithstanding this hypothesis, until now, polyimide has traditionally been the material that has been found to be useful in the art. However, we have discovered that polynorbornene polymers sold under the trademark AVATREL can be used as an alignment layer for LCDs, and in addition, polynorbornene polymers act as an adequate moisture barrier in an LCD. Polynorbornenes (trademarked under the name of AVATREL, and sold by BF Goodrich Specialty Chemicals of Brecksville, Ohio) are synthesized using transition metal catalyzed polymerization from norbornene-based monomers, which are derived from the Diels-Alders adducts of cyclopentadiene. Alkoxy and alkyl (for example, trialkoxy silyl) side groups give polynorbornenes excellent properties such as low dielectric constant (2.4–2.5), low moisture absorption (<0.1%) and excellent adhesion to metals. AVATREL is marketed by BF Goodrich as a dielectric material for use in printed circuit boards and multichip modules, and is commonly sold as a 25% solids solution in a hydrocarbon solvent. We have found that it acts as an adequate moisture barrier to ensure the integrity of the liquid crystal fluid when laid down in a thin solid layer, and it has a previously undiscovered capability to act as an alignment layer for TN and low mux Super-TN LCDs when properly rubbed.

A gap between the two substrates is filled with a liquid crystal fluid 9, and the edges of the substrates are sealed with a sealant material 7 to close the gap and seal in the fluid. The rubbed alignment layer 4 causes the liquid crystal fluid 9 to create an optical property wherein the long axes of the liquid crystal molecules are parallel to the individual elements of the electrode patterns on one substrate and are at right angles to the electrode patterns of the other substrate. The outside surface of at least one substrate has a polarizer 8 disposed thereon, the polarizer having a polarizing axis corresponding to the orientation direction of the liquid crystal molecules. A second polarizer 6 may optionally be located below the other substrate and/or a reflective plate (not shown) may also be used. Incident light from a front side of the LCD is polarized by the polarizer 8 and is rotated approximately ninety degrees (in the case of the TN construction) by the liquid crystal material 9. When voltage is applied to selected electrodes on each substrate, the liquid crystal material 9 changes its optical rotation and changes the direction of the polarized light passing through the LCD, such that a portion becomes dark and a pattern representative of the selected electrodes is displayed.

Figure 3:
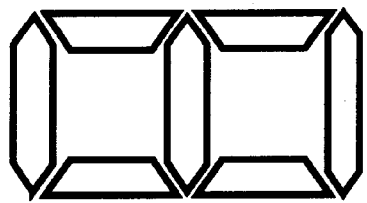
FIGS. 2 and 3 depict one example of an image formed on an LCD.
Figure 2:
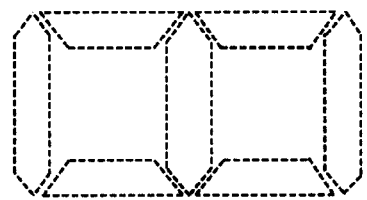

Referring now to FIG. 2, the electrode pattern for a seven segment figure commonly used in LCDs is shown. Those skilled in the art will appreciate that other configurations or patterns may also be employed, such as icons or matrices. When there is no voltage applied to the display, the liquid crystal material is not disturbed, and the display is transparent, as represented by the dashed lines of the figure, indicating that the segments are transparent. When the display is pulsed, it creates a darkened image, as represented by the heavy black lines in FIG. 3. The electrical field applied to the electrodes reorients the liquid crystal material at that location to produce an image. When the voltage is removed, the image disappears, and the appearance of the display reverts back to that shown in FIG. 2.

An example of an LCD fabricated in accordance with our invention will now be described.

EXAMPLE

A twisted nematic liquid crystal display was constructed to be viewed in conventional liquid crystal display mode. The display was constructed with indium-tin oxide (ITO) electrodes formed on opposing faces of parallel plastic substrates. The ITO electrodes and the plastic substrates were then coated with AVATREL to form the alignment layers (AVATREL is a polynorbornene made by BF Goodrich Specialty Chemicals). The alignment layers were rubbed with a low nap velvet cloth, such that the rub direction on the top plastic substrate was perpendicular to the rub direction of the alignment layer on the bottom plastic substrate. The gap between the substrates of the display was approximately 7 microns. After assembly, a liquid crystal fluid (Merck ZLI-5200-000) was injected between the substrates, and the cell was sealed with an epoxy sealant. A variety of other liquid crystal fluids can be used in this invention, such as cyano-biphenyl, phenylcyclohexane and cyclohexylcarboxylic esters. A polarizing film was placed on the outside of each of the substrates and adjusted such that a black on white, or positive mode, display was achieved. When activated by a suitable driver, the LCD cell provided an image that had suitable contrast.

In summary, we have demonstrated that a liquid crystal display cell can be made on plastic substrates without the need for a polyimide alignment layer nor an additional moisture barrier layer. A polynorbornene layer is used in place of the polyimide layer. When rubbed, the polynorbornene acts as an alignment layer and also provides moisture resistance to the cell. While the preferred embodiments of the invention have been illustrated and described, it will be clear that the invention is not so limited, and other equivalents will occur to those skilled in the art without departing from the spirit and scope of the present invention as defined by the appended claims.

What is claimed is:

1. A liquid crystal display cell having an improved alignment layer, the alignment layer consisting essentially of an isotropic, non-birefringent polynorbornene.

2. The liquid crystal display cell as described in claim 1, wherein the alignment layer also functions as a moisture barrier.

3. The liquid crystal display cell as described in claim 1, wherein the alignment layer is a rubbed alignment layer that provides preferential alignment of liquid crystal molecules in the liquid crystal display cell.

4. A substrate for a liquid crystal display, comprising:

a substrate having an electrode pattern deposited thereon and an alignment layer formed over the electrode pattern, said alignment layer comprising isotropic, non-birefringent polynorbornene.

5. The substrate as described in claim 4, wherein the alignment layer consists essentially of a modified polynorbornene.

6. The substrate as described in claim 4, wherein the alignment layer also functions as a moisture barrier.

7. The substrate as described in claim 4, wherein the alignment layer is a rubbed alignment layer that provides preferential alignment of liquid crystal molecules in the liquid crystal display cell.

8. The substrate as described in claim 4, wherein the substrate is plastic.

9. A liquid crystal display cell, comprising:

two plastic substrates, at least one of the substrates having an electrode pattern deposited thereon;

an isotropic, non-birefringent polynorbornene alignment layer disposed on at least one of the substrates and covering the electrode pattern;

the two substrates situated parallel to each other to form a gap between them, the gap filled with a liquid crystal fluid; and a seal around a perimeter of the liquid crystal display cell to contain the liquid crystal fluid.

10. The liquid crystal display cell as described in claim 9, wherein the alignment layer also functions as a moisture barrier.

11. The liquid crystal display cell as described in claim 9, wherein the alignment layer is a rubbed alignment layer.

12. The liquid crystal display cell as described in claim 9, wherein both substrates have an electrode pattern and said polynorbornene alignment layer.

13. The liquid crystal display cell as described in claim 12, wherein the substrates are arranged such that the alignment layers face each other.

* * * * *